United States Patent
Sugai

(10) Patent No.: US 12,277,339 B2
(45) Date of Patent: Apr. 15, 2025

(54) SEMICONDUCTOR STORAGE APPARATUS AND SEMICONDUCTOR SYSTEM FOR EMULATING ERASING OPERATION OF FLASH MEMORY

(71) Applicant: Winbond Electronics Corp., Taichung (TW)

(72) Inventor: Kensaku Sugai, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 35 days.

(21) Appl. No.: 17/861,257

(22) Filed: Jul. 11, 2022

(65) Prior Publication Data

US 2023/0069483 A1 Mar. 2, 2023

(30) Foreign Application Priority Data

Aug. 31, 2021 (JP) .................................. 2021-140753

(51) Int. Cl.
*G06F 3/06* (2006.01)

(52) U.S. Cl.
CPC .......... *G06F 3/0652* (2013.01); *G06F 3/0604* (2013.01); *G06F 3/0659* (2013.01); *G06F 3/0679* (2013.01)

(58) Field of Classification Search
CPC .... G06F 3/0652; G06F 3/0604; G06F 3/0679; G06F 3/0659
See application file for complete search history.

(56) References Cited

U.S. PATENT DOCUMENTS

| | | | |
|---|---|---|---|
| 7,406,558 B2 | 7/2008 | Przybylek | |
| 9,727,258 B1 * | 8/2017 | Nazarian | G11C 16/0483 |
| 9,852,090 B2 * | 12/2017 | Hill | G11C 16/10 |
| 2005/0002263 A1 * | 1/2005 | Iwase | G11C 16/24 |
| | | | 365/230.03 |
| 2007/0143528 A1 | 6/2007 | Przybylek | |
| 2012/0311237 A1 | 12/2012 | Park | |
| 2018/0136851 A1 * | 5/2018 | Batra | G06F 3/0659 |
| 2018/0136877 A1 * | 5/2018 | Ouyang | G11C 16/32 |
| 2020/0186194 A1 | 6/2020 | Gilbert | |

FOREIGN PATENT DOCUMENTS

| | | |
|---|---|---|
| CN | 113010445 | 6/2021 |
| JP | 6810725 | 1/2021 |
| TW | 201728085 | 8/2017 |
| TW | I646537 | 1/2019 |
| TW | I698976 | 7/2020 |
| TW | 202101203 | 1/2021 |

\* cited by examiner

Primary Examiner — Mark A Giardino, Jr.
(74) Attorney, Agent, or Firm — JCIPRNET

(57) ABSTRACT

A semiconductor storage apparatus having a function of emulating an erasing operation of a flash memory is provided. A resistive random access memory of the disclosure includes: a memory cell array; a controller that reads or writes the memory cell array according to an input of command; an erasing command allowance register that sets whether or not to receive an erasing command; and a busy time adjustment register that adjusts a busy time. In a case of setting to allow a reception of the erasing command, the controller responds to an input of the erasing command to emulate the erasing operation, and specifies busy information including the busy time adjusted by the busy time adjustment register.

13 Claims, 6 Drawing Sheets

SEMICONDUCTOR STORAGE APPARATUS AND SEMICONDUCTOR SYSTEM FOR EMULATING ERASING OPERATION OF FLASH MEMORY

CROSS-REFERENCE TO RELATED APPLICATION

This application claims the priority benefit of Japan application serial no. JP 2021-140753, filed on Aug. 31, 2021. The entirety of the abovementioned patent application is hereby incorporated by reference herein and made a part of this specification.

BACKGROUND

Technical Field

The disclosure relates to a semiconductor storage apparatus such as a resistive random access memory, an electrically erasable programmable read only memory (EEPROM), etc., and in particular to a semiconductor storage apparatus configured to emulate an erasing operation of a flash memory.

Description of Related Art

As a non-volatile memory in place of the NOR type and the NAND type flash memory, there is a resistive random access memory using a variable resistance element. The resistive random access memory stores data by applying a pulse voltage to the variable resistance element to change the variable resistance element to a high resistance state or a low resistance state in a reversible and non-volatile manner (for example, Patent Literature 1: JP Laid-Open No. 6810725).

As shown in FIG. 1, a software for controlling a flash memory is installed in a host device (computer device) 10, and the host device 10 outputs commands necessary for the operation of a flash memory 20. FIG. 2 is an operation process when data rewriting is performed by a software that controls a flash memory. There is no data rewriting in the flash memory (for example, rewriting data "0" to data "0"); therefore, in reality data rewriting is performed by performing erasing to change data "0" into data "1", and then by performing programming to change data "1" into data "0." That is, the host device 10 inputs an erasing command to the flash memory 20 (S10) and stands-by during the busy period of the erasing operation (S12). Then, the host device 10 inputs a programming command (S14) and stands-by during the busy period of the programming operation (S16) to end the rewriting. When the flash memory is equipped with a parallel interface, a busy signal indicating whether the busy signal is in a busy state is transmitted to the host device 10 via the busy terminal; when equipped with a serial interface (serial peripheral interface (SPI)), the host device 10 reads the busy information maintained in the status register which indicates whether the busy information is in a busy state.

FIG. 3 is an operation process when data rewriting is performed by controlling a software of a resistive random access memory. There is no data erasing in the resistive random access memory; data rewriting (for example, rewriting data "0" to data "0") is performed by directly writing data. That is, the host device 10 inputs a writing command to the resistive random access memory (S20), writes data, and stands-by during the busy time of the writing operation (S22) to end the rewriting.

A difference exists between the software that controls the flash memory 20 and the software that controls the resistive random access memory. FIG. 4 is an operation process when a software for controlling a flash memory 20 is used in a resistive random access memory. When a host device 10 inputs an erasing command of the flash memory to the resistive random access memory (S30), since the resistive random access memory does not define the erasing command, a busy state will not be generated (S32) and substantially there is no action performed. The host device 10 cannot confirm the busy state and therefore determines that the erasing command is wrong (S34) to end the rewriting. Therefore, a problem exists when the software asset designed for the flash memory cannot be effectively applied to the resistive random access memory.

The disclosure is intended to solve such an existing problem, with an objective to provide a semiconductor storage apparatus having a function that can emulate an erasing operation of a flash memory.

SUMMARY

The semiconductor storage apparatus of the disclosure includes: a memory cell array; a control component, which reads or writes the memory cell array according to an input of command; a setting component, which sets whether or not to receive an erasing command of a flash memory; and an adjustment component, which adjusts busy time. When the setting component is set to be able to receive the erasing command, the control component responds to an input of the erasing command, emulates the erasing operation of the flash memory, and controls busy information according to the busy time adjusted by the adjustment component.

The semiconductor system of the disclosure includes the abovementioned semiconductor storage apparatus and a computer device connected to the semiconductor storage apparatus, in which the computer device controls the semiconductor storage apparatus according to a software for operating a flash memory.

According to the disclosure, since the function of emulating an erasing operation of a flash memory is provided, the software resource for controlling the flash memory can be used in a semiconductor storage apparatus such as a resistive random access memory that does not have an erasing operation.

DETAILED DESCRIPTION OF DISCLOSED EMBODIMENTS

Next, embodiments of the disclosure are described in detail with reference to the drawings. The semiconductor storage apparatus of the disclosure involves a non-volatile semiconductor memory such as a resistive random access memory or an EEPROM that does not have an erasing operation like a flash memory.

Figure 1:
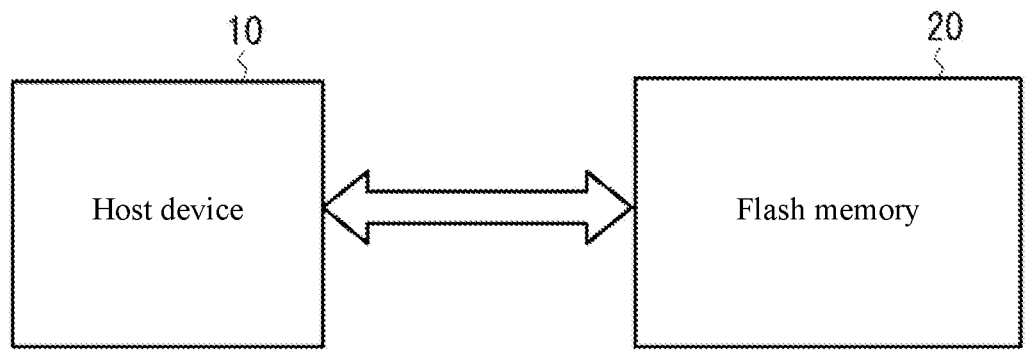
FIG. 1 is a diagram showing a connection relationship between a host device and a flash memory.
Figure 2:
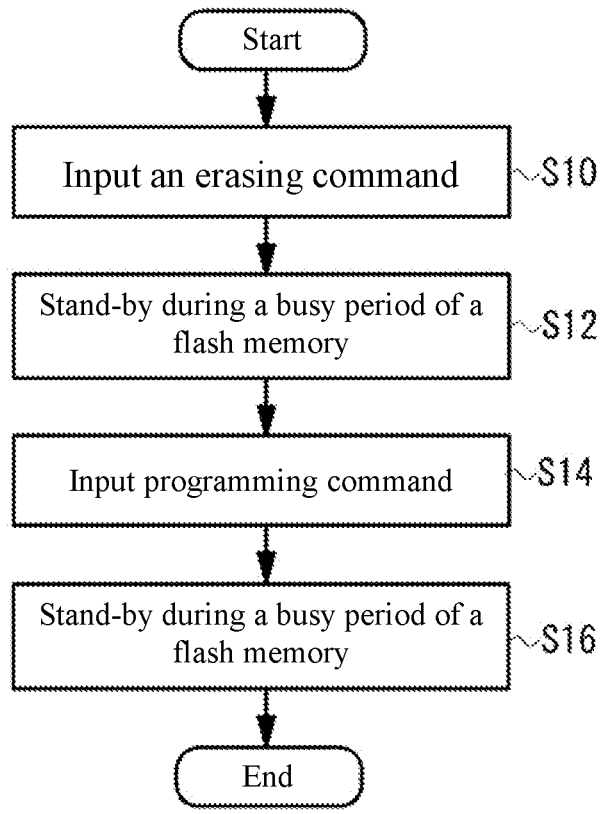
FIG. 2 is an operation process when data rewriting is performed by a software that controls a flash memory.
Figure 3:
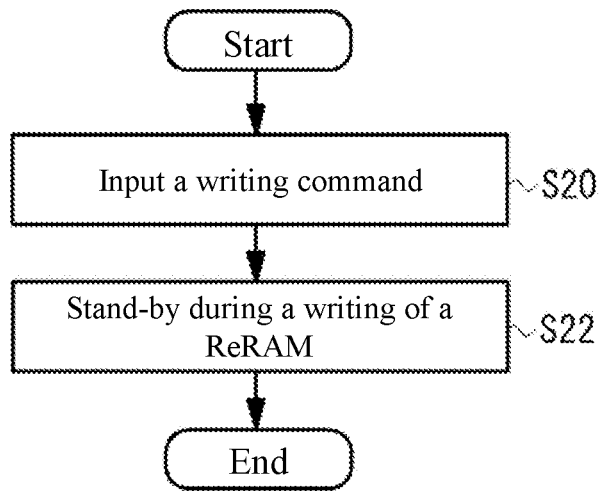
FIG. 3 is an operation process when data rewriting is performed by a software that controls a resistive random access memory.
Figure 4:
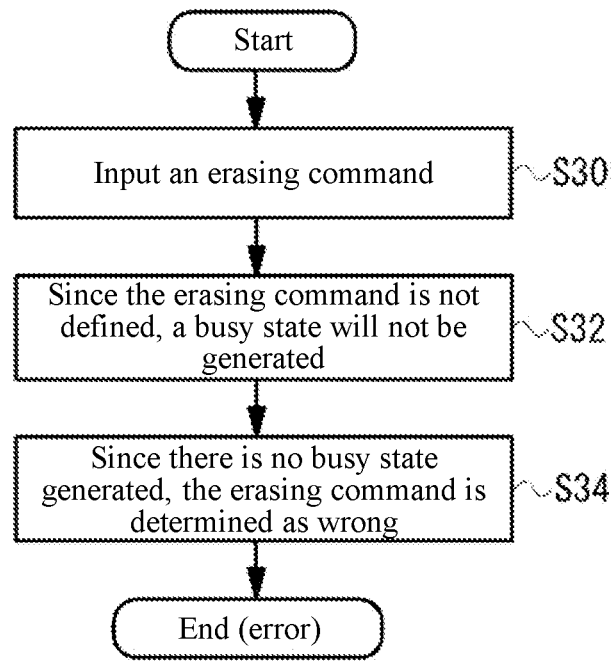
FIG. 4 is an operation process when data rewriting of a resistive random access memory is performed by a software that controls a flash memory.
Figure 5:
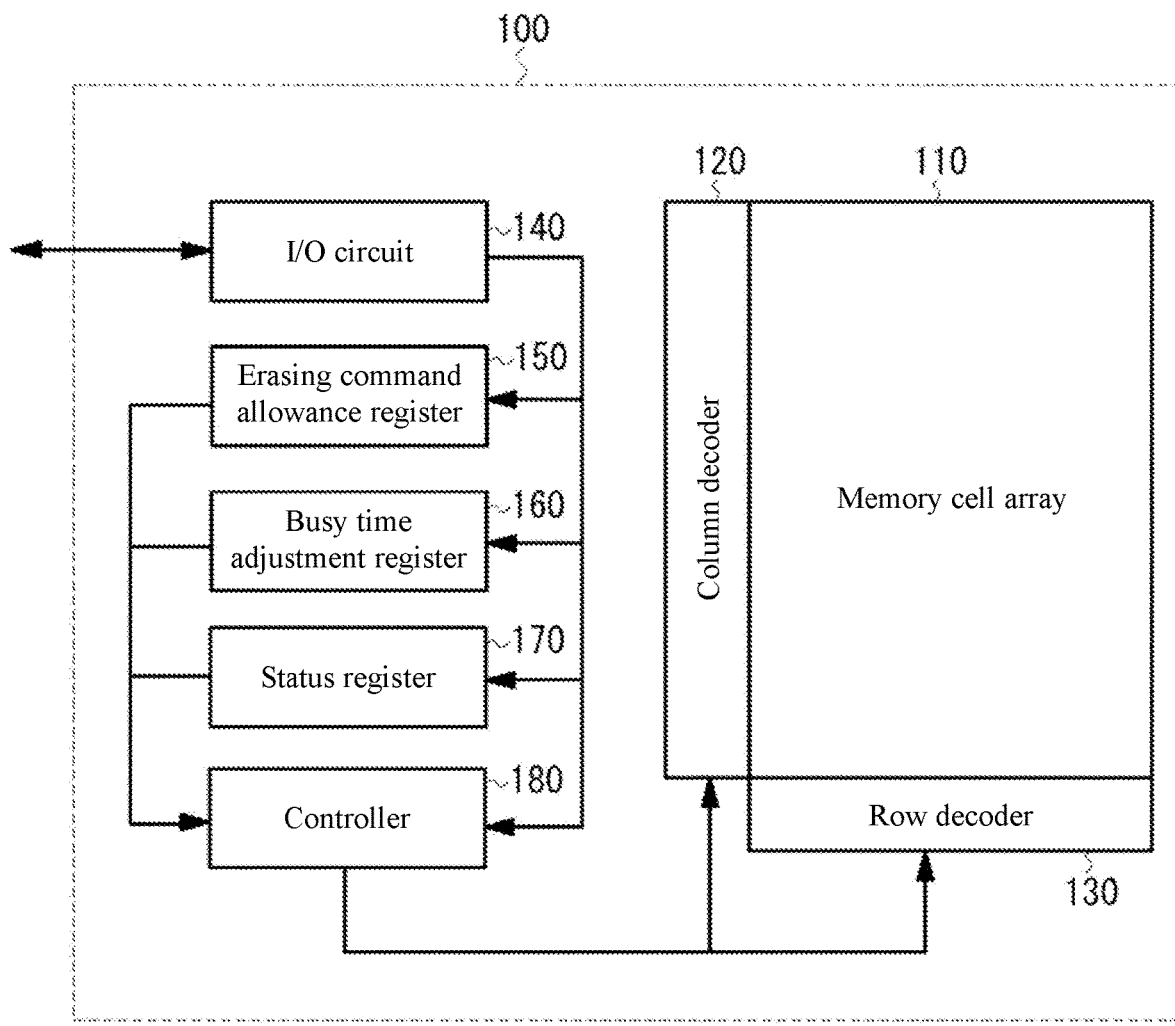
FIG. 5 is a schematic diagram showing a configuration of a resistive random access memory according to an embodiment of the disclosure.

FIG. 5 is a block diagram showing a configuration of a main part of a resistive random access memory according to an embodiment of the disclosure. A resistive random access memory 100 of the embodiment includes a memory cell array 110, a column decoder 120, a row decoder 130, an I/O circuit 140, an erasing command allowance register 150, a busy time adjustment register 160, a status register 170, and a controller 180 and the like.

Figure 6:
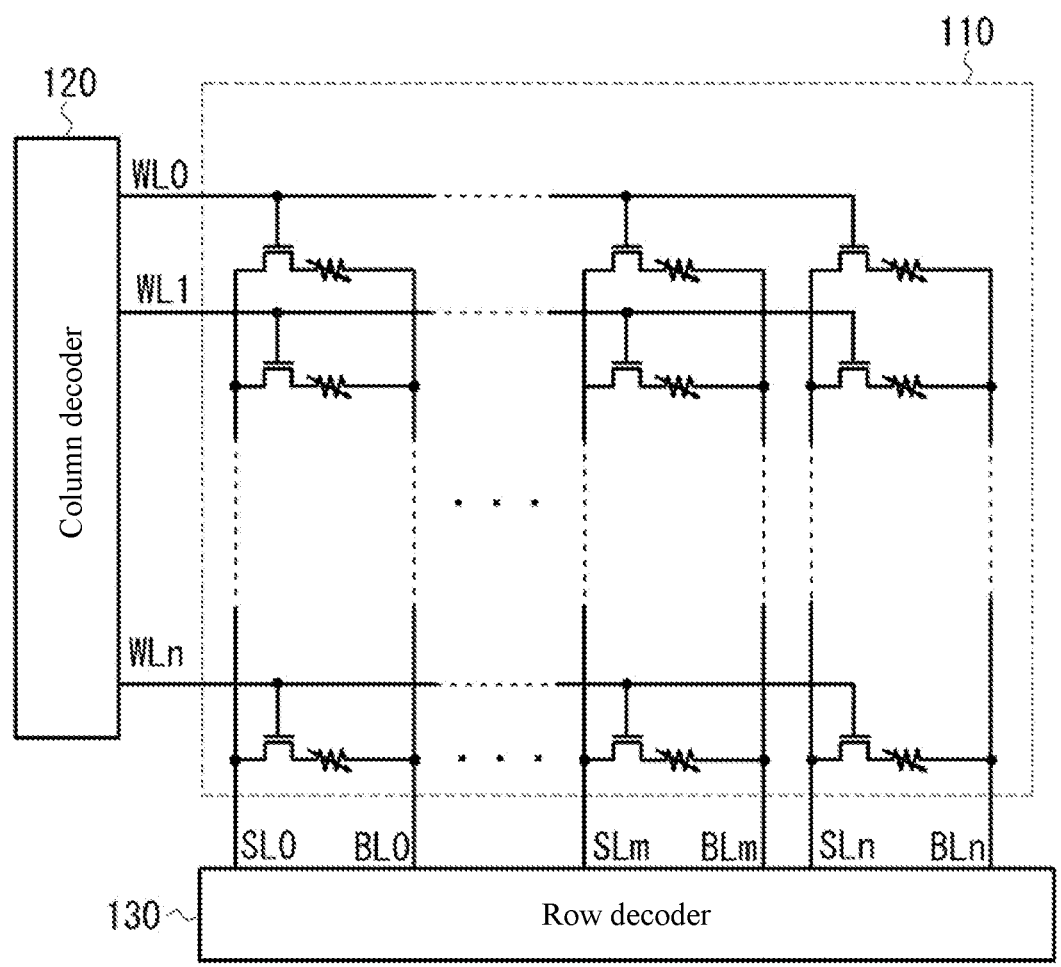
FIG. 6 is a diagram showing a configuration of a memory cell array of a resistive random access memory.

As shown in FIG. 6, the memory cell array 110 includes a plurality of memory cells arranged in a matrix, and each memory cell includes an access transistor and a variable resistance element. Gates of the access transistors in the column axial direction are altogether connected to word lines WL0, WL1, . . . , WLn in the column axial direction. Drain regions of the access transistors are connected to one of the electrodes of the variable resistance elements. Source regions in the row axial direction are altogether connected to source lines SL0, . . . , SLm, and SLn. Other electrodes of the variable resistance elements in the row axial direction are altogether connected to bit lines BL0, . . . , BLm, and BLn.

The variable resistance element is formed of, for example, a thin film oxide of a transition metal such as hafnium oxide (HfOx), and sets or resets by writing the polarity and magnitude of a pulse voltage. For example, the variable resistance element is set to a low resistance state when a current flow circulates from the bit line side to the source line side, and is reset to a high resistance state when the current flow circulates from the source line side to the bit line side. Furthermore, the memory cell is not limited to the configuration of one transistor and one resistor (1T1R) as shown in FIG. 6, and can be formed by two transistors and two resistors (2T2R) such as when one of the variable resistance elements is set and the other variable resistance element is reset.

The column decoder 120 selects the word lines according to the column address from the controller 180, and the row decoder 130 selects the source lines and the bit lines according to the row address from the controller 180. The I/O circuit 140 receives commands, addresses, data, etc., from a host device, or outputs data read from the memory cell array to the host device. The I/O circuit 140 when equipped with, for example, a serial interface (SPI), receives commands, addresses, and the like output from the host device in synchronization with a clock signal. A flash memory is also often equipped with an SPI, and the host device can access a resistive random access memory 100 through the SPI similarly to the flash memory.

An erasing command allowance register 150 sets whether or not to receive an erasing command of the flash memory. In other words, information is set regarding whether the resistive random access memory 100 emulates an erasing operation of the flash memory. The setting can be done by the user, that is, by using a writing command from the host device to the erasing command allowance register 150, for example, set enablement or disablement in 1 bit of the erasing command allowance register 150. Although the resistive random access memory 100 does not have the function of the erasing operation like the flash memory, by setting the resistive random access memory 100 with a function of emulating the erasing operation of the flash memory, the host device can control the resistive random access memory 100 by a software that controls the flash memory.

A busy time adjustment register 160 sets a busy time of when the resistive random access memory 100 emulates the erasing operation of the flash memory. In the flash memory, when the erasing operation is performed in response to the erasing command, a busy signal indicating a busy state is output during the erasing operation. In order to emulate the busy state of the flash memory, the busy time adjustment register 160 is used. Regarding the busy time of the flash memory, when units of erasing vary, such as erasing in units of magnetic sectors or erasing in units of blocks, the erasing time (that is the busy time) varies. In addition, the erasing time (that is the busy time) varies according to the technological generation of the flash memory. Therefore, if the busy time is fixed in the resistive random access memory 100, the actual busy time of the flash memory cannot be correctly matched. In order to eliminate this problem, the busy time adjustment register 160 maintains the adjusted busy time and controls the busy state according to the adjusted busy time.

In a certain form, the busy time is set by the user, that is, the host device inputs a writing command to the busy time adjustment register 160 and thereby writes an arbitrary busy time into the busy time adjustment register 160. The busy time adjustment register 160 is formed of, for example, 8 bits and can set the time from levels 0 to 255. If the unit is previously set to milliseconds, an adjustment is 0 ms to 255 ms. In addition, in another form, the busy time adjustment register 160 may include a plurality of registers, and the values set in the plurality of registers are summed to adjust the busy time. In this case, one of the registers maintains the busy time in a typical erasing operation of the flash memory as a default value, and the other register maintains the busy time arbitrarily adjusted by the user, and the two values of the registers are summed to adjust the busy time.

A status register 170 maintains various operation status of the resistive random access memory 100. One of the information maintained by the status register 170 includes a pseudo-busy information when the resistive random access memory 100 emulates the erasing operation of the flash memory. The busy information is formed of, for example, 1 bit, with a H level commonly indicating the busy state and a L level commonly indicating not in the busy state. The busy state of the busy information is controlled by the busy time maintained in the busy time adjustment register 160.

The controller 180 includes a command decoder for decoding commands received via the I/O circuit 140 and a logic for controlling the various parts of the resistive random access memory 100. When receiving a writing command to the erasing command allowance register 150, the controller 180 writes the enablement or disablement received via the I/O circuit 140 into the erasing command allowance register 150. In addition, when receiving a writing command to the busy time adjustment register 160, the controller 180 writes the data for adjusting the busy time received via the I/O circuit 140 into the busy time adjustment register 160. Furthermore, when receiving a command to read the status information maintained in the status register 170, the controller 180 outputs the status information maintained in the status register 170 to the host device via the I/O circuit 140. The status information includes busy information.

When the erasing command of the flash memory is received from the host device via the I/O circuit 140, if enablement is set in the erasing command allowance register 150, the controller 180 responds to the erasing command by emulating the erasing operation of the flash memory. In this case, a setting to write data "1" is performed on the memory cell of the block or magnetic sector selected according to the address input together with the erasing command. The setting to write data "1" is equivalent to the erasing of data "1" of the flash memory. Furthermore, the controller 180 controls the busy state of the busy information of the status register 170 according to the busy time set in the busy time adjustment register 160. On the other hand, if disablement is set in the erasing command allowance register 150, the controller 180 does not respond to the erasing command and does not emulate the erasing operation of the flash memory.

In addition, when receiving a command to set writing or reset writing of the resistive random access memory 100, the controller 180 writes the selected memory cell based on the address and data input via the I/O circuit 140, and when a command to read is received, reads the selected memory cell based on the address input via the I/O circuit 14 and outputs the data read from the I/O circuit 140 to the host device. Furthermore, the resistive random access memory 100 includes a voltage generating circuit, a read-write circuit for reading and writing, and a sensing circuit for sensing the read data, but these configurations are not directly related to the disclosure and are therefore omitted.

Figure 7:
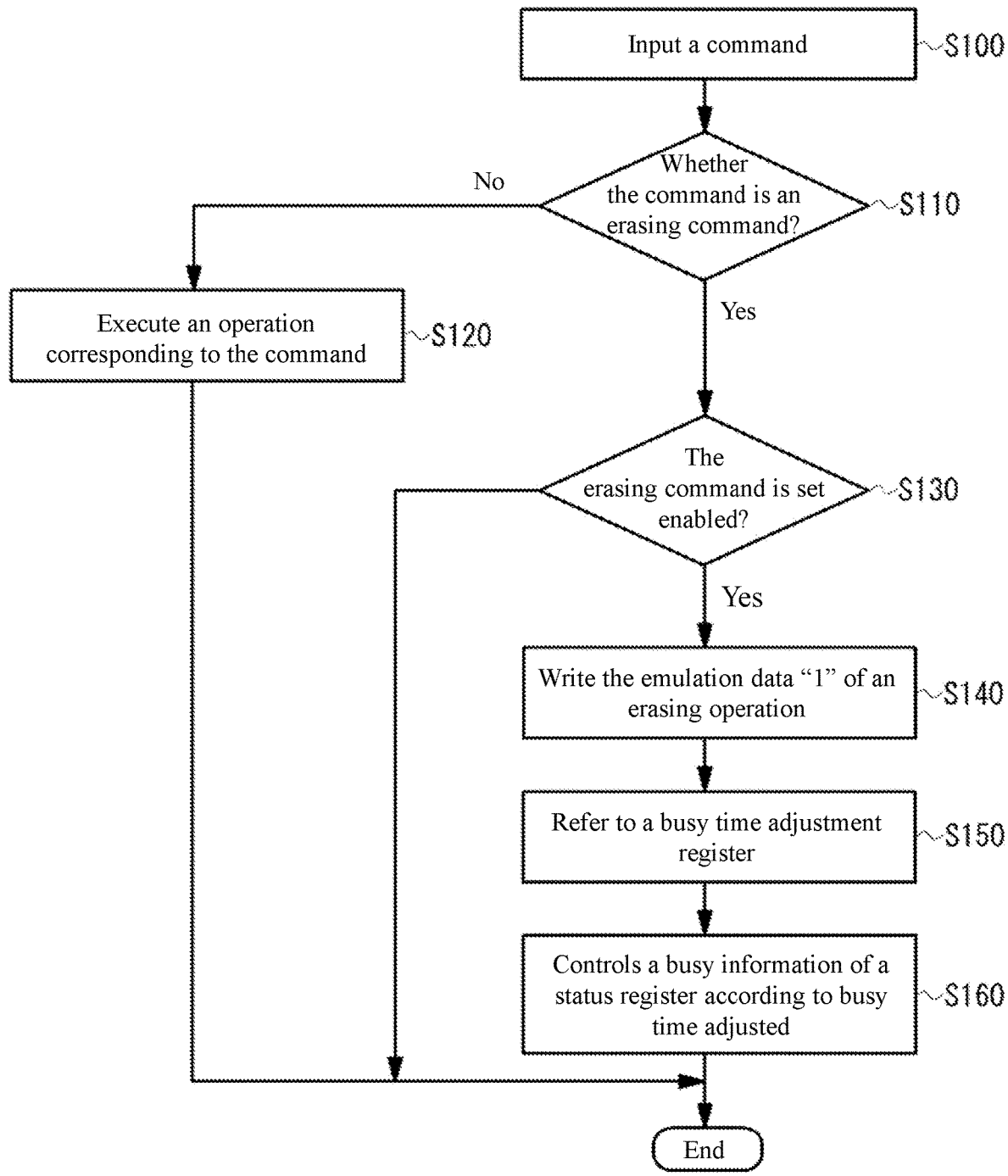
FIG. 7 is a process illustrating an emulation of an erasing operation of a resistive random access memory according to an embodiment of the disclosure.

Next, with reference to the process of FIG. 7, an embodiment will describe an emulation of an erasing operation of a resistive random access memory. When receiving a command from a host device (S100), a controller 180 interprets the command and determines whether the command is an erasing command (S110). In the case where the command is other than the erasing command (for example, a read command and a writing command), the controller 180 executes the writing and reading operations corresponding to the command (S120).

When the command is determined to be the erasing command, the controller 180 determines whether or not an enablement to receive the erasing command is set in the erasing command allowance register 150 (S130). When the enablement to receive the erasing command is set, the controller 180 emulates the erasing operation of a flash memory (S140). That is, the controller 180 writes data "1" into a memory cell specified according to the address input together with the erasing command. For example, in the case where erasing is performed in units of blocks, the data "1" is written to all memory cells corresponding to the blocks. The writing of the data "1" is equivalent to the erasing of the data "1" of the flash memory.

Furthermore, the controller 180 refers to a busy time adjustment register 160 in parallel with the writing (S150) and controls a busy information of a status register 170 according to a busy time set in the busy time adjustment register 160 (S160). That is, during the set busy time period, the busy information indicates a busy state. The adjusted busy time is equivalent to the output busy time when the flash memory actually performs the erasing operation.

The host device reads the busy information of the status register 170 after outputting the erasing command to the resistive random access memory 100, thereby knowing the busy state of the resistive random access memory 100. Therefore, the host device recognizes that the erasing command is correctly executed in the resistive random access memory 100.

In this way, according to the embodiment, by setting the resistive random access memory with a function of emulating the erasing operation of the flash memory, the host device can control the resistive random access memory by a software that controls the flash memory and can effectively use the software resource of the flash memory, even when the flash memory is replaced with a resistive random access memory.

Next, a second embodiment of the disclosure is described. In the first embodiment, the busy time is controlled according to the busy time set by the user, while in the second embodiment, busy time is automatically selected according to an erasing command, and busy information is controlled according to the selected busy time. In the second embodiment, the busy time adjustment register 160 includes a plurality of registers, and each register sets the busy time corresponding to the erasing command. For example, the first register sets the busy time when erasing is performed in units of blocks, and the second register sets the busy time when erasing is performed in units of magnetic sectors. Erasing time varies according to the units of erasing; therefore, the busy time is set in the first register and the second corresponding to the erasing unit.

Figure 8:
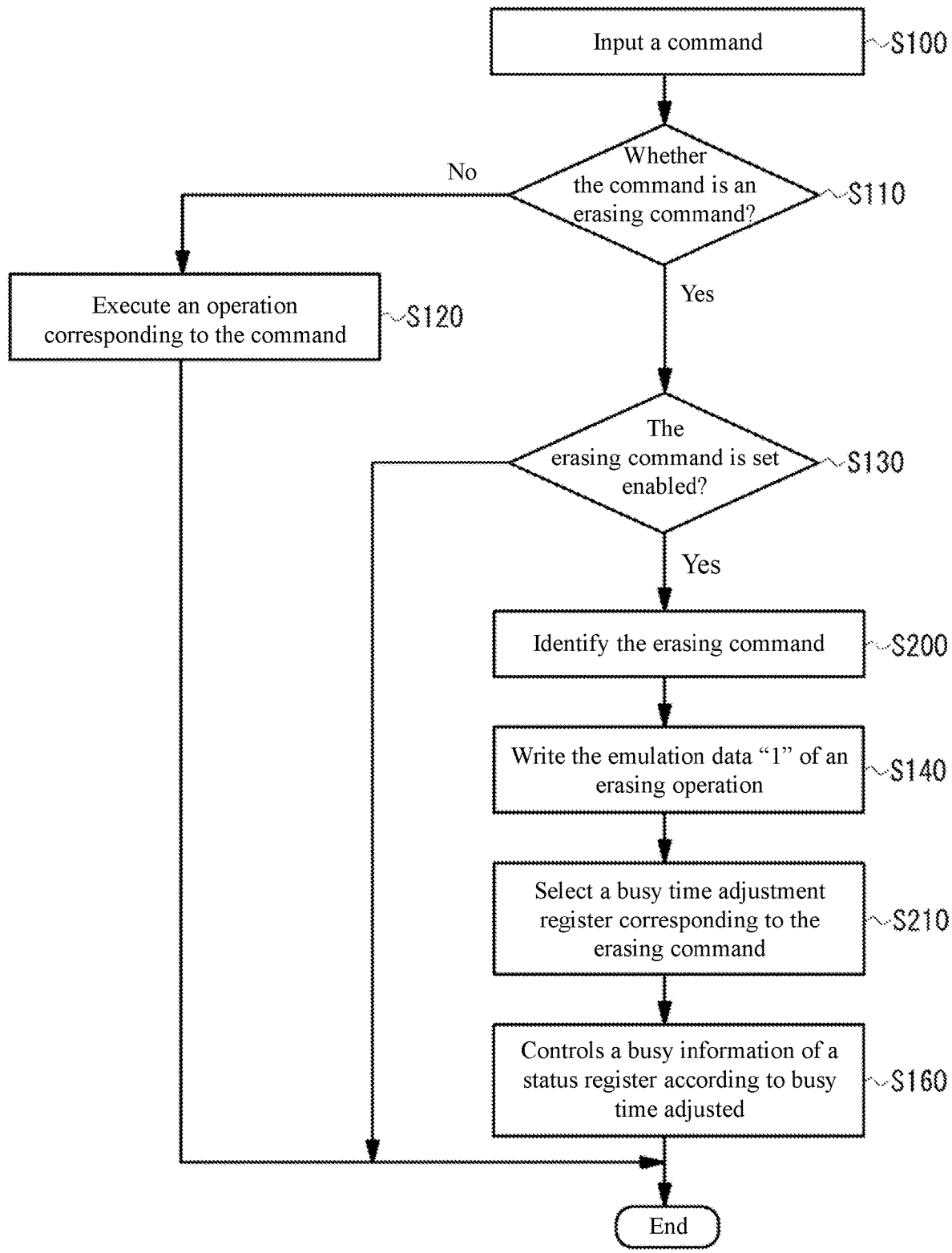
FIG. 8 is a process illustrating an emulation of an erasing operation of a resistive random access memory according to the second embodiment of the disclosure.

FIG. 8 is a diagram showing the process of the emulation of the erasing operation based on the second embodiment. Steps S100, S110, S120, S130, S140, and S160 are the same as those shown in FIG. 7 in the first embodiment.

When an input of command is the erasing command (S110) and reception of the erasing command is set enabled (S130), the controller 180 further identifies the type of the erasing command (S200). For example, there are erasing commands in units of blocks and erasing commands in units of magnetic sectors in the flash memory, and the controller 180 identifies such erasing commands. The controller 180 writes the data "1" into the memory cell specified by the address (S140), selects and identifies the busy time adjustment register 160 corresponding to the erasing command in parallel with such writing, and reads the busy time set in the selected register (S210). For example, if the erasing command is based on units of blocks, the first register is selected and the busy time set in the first register is read. If the erasing command is based on units of magnetic sectors, the second register is selected and the busy time set in the second register is read. The controller 180 controls the busy information of the status register 170 according to the busy time read.

In this way, according to the embodiment, the busy time corresponding to the erasing command is respectively set in the plurality of busy time adjustment registers 160, and the busy time adjustment registers 160 are selected according to the erasing command being input. Therefore, the busy time is automatically adjusted according to the erasing command.

The abovementioned embodiment exemplifies the resistive random access memory as a semiconductor storage apparatus that substantially does not have the erasing operation of the flash memory, but other than that, the disclosure, for example, may also be applied to a memory such as an EEPROM and the like.

Although the preferred embodiments of the disclosure have been described in detail, the disclosure is not limited to the specific embodiments, and various modifications and changes can be made within the scope described in the claims of the disclosure.

What is claimed is:

1. A semiconductor storage apparatus, comprising:
a memory cell array;
a control component for reading or writing the memory cell array according to an input of a command;
a setting component for setting whether or not to receive an erasing command of a flash memory; and
an adjustment component for adjusting a busy time,
wherein when the setting component is set to be able to receive the erasing command, the control component responds to the input erasing command, emulates an erasing operation of the flash memory, and controls busy information according to the busy time adjusted by the adjustment component,
the adjustment component comprises at least one register capable of setting the busy time and is capable of being set by a user,
the at least one register comprises a first register for setting a fixed busy time, and a second register through which a user is capable of setting an arbitrary busy time, and
the control component controls the busy information according to a total busy time summed up by the busy time set in the first register and the busy time set in the second register.

2. The semiconductor storage apparatus according to claim 1, wherein,
the setting component comprises a register capable of being set by a user.

3. The semiconductor storage apparatus according to claim 1, wherein,
the semiconductor storage apparatus further comprises an output component which outputs the busy information.

4. The semiconductor storage apparatus according to claim 3, wherein,
the output component comprises a status register which maintains the busy information capable of being read by a user.

5. The semiconductor storage apparatus according to claim 1, wherein,
the control component performs the same data writing as the erasing operation of the flash memory to a memory cell selected according to an address input together with the erasing command.

6. The semiconductor storage apparatus according to claim 1, wherein
the semiconductor storage apparatus is a resistance random storage apparatus or a non-volatile storage apparatus that does not have a function of the erasing operation of the flash memory, and the semiconductor storage apparatus is controlled according to a software that is designed to operate the flash memory.

7. A semiconductor system, comprising:
the semiconductor storage apparatus according to claim 1; and
a computer device connected to the semiconductor storage apparatus, wherein the computer device controls the semiconductor storage apparatus according to the software for operating the flash memory.

8. A semiconductor storage apparatus, comprising:
a memory cell array;
a control component for reading or writing the memory cell array according to an input of a command;
a setting component for setting whether or not to receive an erasing command of a flash memory; and
an adjustment component for adjusting a busy time,
wherein when the setting component is set to be able to receive the erasing command, the control component responds to the input erasing command, emulates an erasing operation of the flash memory, and controls busy information according to the busy time adjusted by the adjustment component,
the adjustment component comprises at least one register capable of setting the busy time,
the at least one register comprises a first register for setting a busy time corresponding to a first erasing command, and a second register for setting a busy time corresponding to a second erasing command;
wherein the control component selects the first register or the second register according to the input erasing command, and controls the busy information according to the busy time set in the first register or the second register.

9. The semiconductor storage apparatus according to claim 8, wherein,
the first erasing command is an erasing command based on units of blocks, and the second erasing command is an erasing command based on units of magnetic sectors.

10. The semiconductor storage apparatus according to claim 8, wherein
the semiconductor storage apparatus is a resistance random storage apparatus or a non-volatile storage apparatus that does not have a function of the erasing operation of the flash memory, and the semiconductor storage apparatus is controlled according to a software that is designed to operate the flash memory.

11. The semiconductor storage apparatus according to claim 8, wherein
the semiconductor storage apparatus further comprises an output component which outputs the busy information.

12. The semiconductor storage apparatus according to claim 8, wherein
the output component comprises a status register which maintains the busy information capable of being read by a user.

13. The semiconductor storage apparatus according to claim 8, wherein
the control component performs the same data writing as the erasing operation of the flash memory to a memory cell selected according to an address input together with the erasing command.

* * * * *